United States Patent [19]

Tsuchida et al.

[11] Patent Number: 4,875,444
[45] Date of Patent: Oct. 24, 1989

[54] SWIRL CHAMBER FOR DIESEL ENGINES AND THE LIKE

[75] Inventors: Hirofumi Tsuchida, Yokosuka; Toshiaki Tanaka, Fujisawa; Akira Oyamada, Yono; Sumio Hirao, Yokohama, all of Japan

[73] Assignee: Nissan Motor Co., Ltd., Yokohama, Japan

[21] Appl. No.: 225,188

[22] Filed: Jul. 28, 1988

[30] Foreign Application Priority Data

Jul. 29, 1987 [JP] Japan .................. 62-116404[U]

[51] Int. Cl.$^4$ ................ F02B 3/00; F02B 75/98
[52] U.S. Cl. ................................. 123/270; 123/273; 123/271
[58] Field of Search ........... 123/270, 271, 273, 254, 123/286

[56] References Cited

U.S. PATENT DOCUMENTS

| | | | |
|---|---|---|---|
| 1,798,260 | 3/1931 | Hehr | 123/270 |
| 1,874,994 | 8/1932 | Hehr | 123/270 |
| 3,967,013 | 6/1976 | Danis | 123/270 |
| 4,224,980 | 9/1980 | Buchner | 165/32 |
| 4,325,334 | 4/1982 | Nishida et al. | 123/270 |
| 4,577,600 | 3/1986 | Morita et al. | 123/270 |
| 4,651,692 | 3/1987 | Morita et al. | 123/270 |
| 4,662,331 | 5/1987 | Ogawa et al. | 123/270 |
| 4,676,207 | 6/1987 | Kawamura et al. | 123/270 |
| 4,681,074 | 7/1987 | Ogawa et al. | 123/270 |
| 4,699,102 | 10/1987 | Taniguchi | 123/270 |
| 4,714,062 | 12/1987 | Toeda | 123/270 |
| 4,738,227 | 4/1988 | Kamo et al. | 123/270 |

FOREIGN PATENT DOCUMENTS

| | | |
|---|---|---|
| 0141540 | 5/1985 | European Pat. Off. . |
| 2813594 | 10/1979 | Fed. Rep. of Germany . |
| 1344892 | 10/1963 | France . |
| 2380422 | 9/1978 | France . |
| 60-171931 | 11/1985 | Japan .................. 123/270 |

*Primary Examiner*—Raymond A. Nelli
*Attorney, Agent, or Firm*—Foley & Lardner, Schwartz, Jeffery, Schwaab, Mack, Blumenthal & Evans

[57] ABSTRACT

A dome shaped ceramic insert which defines a portion of a swirl chamber is formed at the crown portion with a single aperture through which both the fuel injector and the glow plug can extend. The cylinder head is formed with a portion which fits into the aperture and which has a wall portion which cooperates with the inner walls of the insert to define the upper section of the swirl chamber.

8 Claims, 4 Drawing Sheets

SWIRL CHAMBER FOR DIESEL ENGINES AND THE LIKE

BACKGROUND OF THE INVENTION

1. Field of the Invention

The present invention relates to a swirl chamber type Diesel engine and more specifically to such a type of engine wherein the swirl chamber is defined within ceramic inserts which inserts are fitted into a recess formed in an alloy engine cylinder head and which improve the thermal efficiency of the engine by limiting the amount of heat which is lost through the swirl chamber walls.

2. Description of the Prior Art

JM-A-60-171931 discloses a swirl chamber of the nature shown in FIG. 1. This arrangement includes a piston 1 which is reciprocatively disposed in a cylinder 2. The top of the cylinder is closed by a cylinder head 3 in a manner to define a variable volume main combustion chamber 4 therein. The cylinder head 3 is formed with a cavity (no numeral) in which a swirl chamber 5 is defined by a ceramic hot plug 6 and a ceramic dome member 7.

A fuel injector 8 and a glow plug 9 are arranged to project into the swirl chamber through apertures 8a and 9a formed in the ceramic dome member 7.

This arrangement, while limiting the amount of heat which can be transferred to the metallic cylinder head 3 through the ceramic members 6 and 7, has suffered from the drawback that, as the interior of the swirl chamber is exposed to hot combustion gases, the inner surface of the members defining the swirl chamber are induced to develop a very high temperature while, as the amount of heat which is transferred through the ceramic members is relatively small, the temperature of the outer surface, particularly in the case of the dome member 7, is lower than that of the inner one. This produces a temperature differential which induces thermal stress. This stress tends to concentrate in the bridge-like portion of the dome member 7 defined between the openings 8a and 9a, and tends to induce the formation of cracks therein.

SUMMARY OF THE INVENTION

It is an object of the present invention to provide a swirl chamber arrangement which limits the amount of heat which is lost from the swirl chamber while obviating the cracking phenomenon which plagues the above described prior art.

In brief, the above object is achieved by an arrangement wherein a dome shaped ceramic insert, which defines a portion of a swirl chamber, is formed at the crown portion with a single aperture through which both the fuel injector and the glow plug can extend. The cylinder head is formed with a portion which fits into the aperture and which has a wall portion which cooperates with the inner walls of the insert to define the upper section of the swirl chamber.

More specifically, a first aspect of the present invention is deemed to comprise a swirl chamber type internal combustion engine which engine features. a thermally insulating member disposed in a recess formed in a metallic cylinder head, the insulating member including a cavity which defines a portion of the swirl chamber; means defining an aperture in the insulating member; and means defining a metallic projection which fits into the aperture, the projection including first and second bores, the first and second bores being arranged to receive first and second devices which are essential to the operation of the engine.

A second aspect of the invention is deemed to comprise an engine which features: a cylinder defined in a cylinder block; a piston reciprocatively disposed in the cylinder; a cylinder head secured to the cylinder block in a manner to close the cylinder and to define a main variable volume combustion chamber, the cylinder head being formed of a metal and including a recess; a thermally insulating member disposed in the recess, the insulating member forming a portion of a swirl chamber which is fluidly communicated with the main variable volume combustion chamber; and means defining a singe opening in said insulating member through which a fuel injector and a glow plug extend operatively into said swirl chamber.

DETAILED DESCRIPTION OF THE PREFERRED EMBODIMENTS

Figure 1:
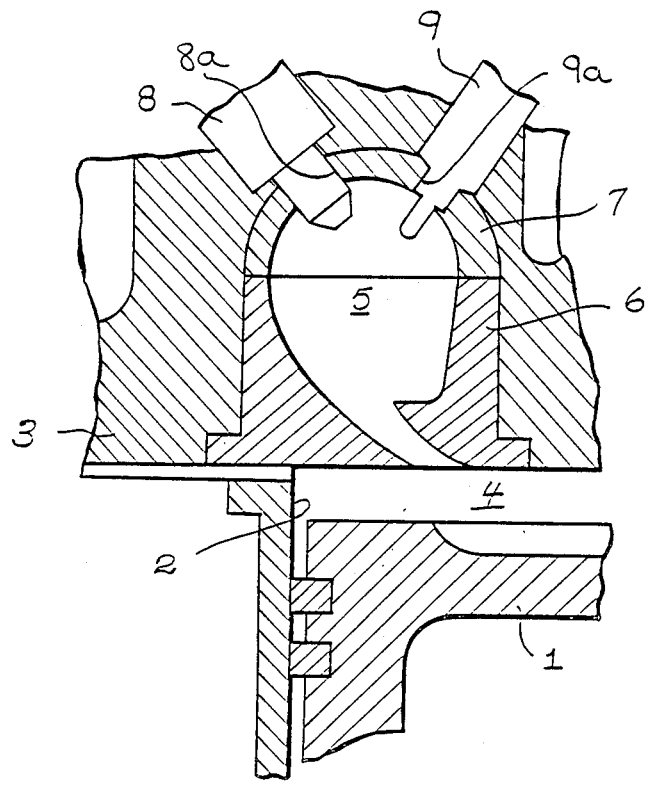
FIG. 1 is a vertical section showing the prior art arrangement disclosed in the opening paragraph is of the instant disclosure.
Figure 2:
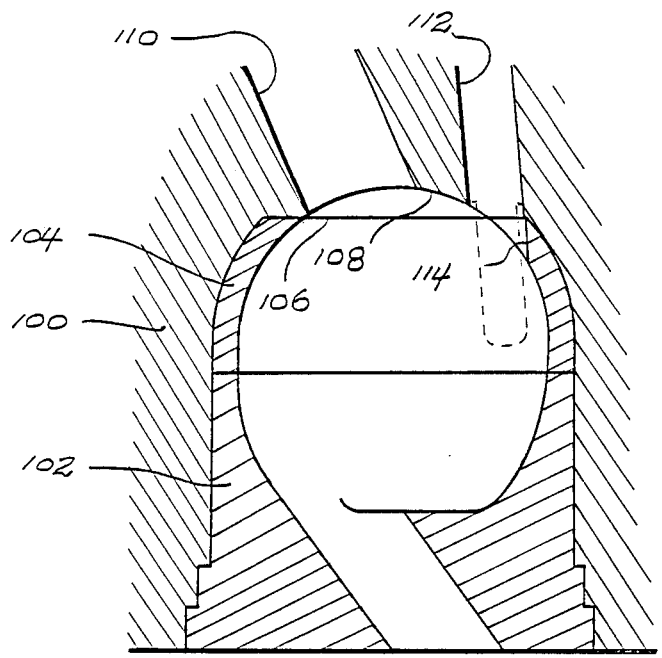
FIGS. 2 and 3 are respectively sectional elevation and plan views showing a first embodiment of the present invention.
Figure 3:
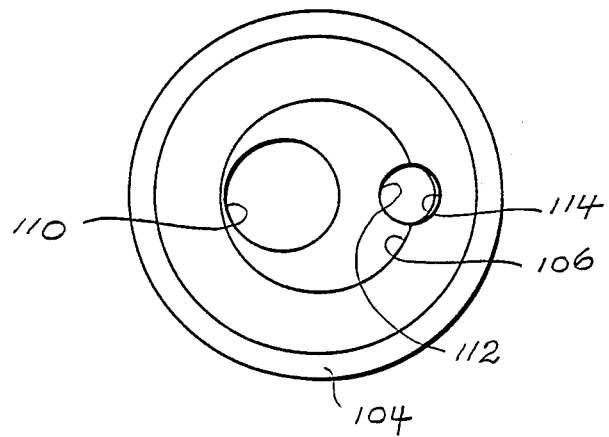

FIGS. 2 and 3 show a first embodiment of the present invention. In this arrangement an aluminum alloy cylinder head 100 is formed with a shaped recess (no numeral) into which a ceramic hot plug 102, and a ceramic dome shaped member 104 are force fitted. The upper or crown portion of the dome member 104 is formed with an essentially circular aperture 106. The portion of the cylinder head into which the dome member 106 is disposed is shaped in the manner shown in FIG. 2 to have a projection which fits into the aperture. This projection has a wall portion 108 which defines the upper portion of the swirl chamber and cooperates with the inner wall of the dome member 104 to define an essentially continuous swirl chamber surface.

Bores 110, 112 in which a fuel injector and a glow plug are disposable, are formed in the cylinder head 100 in a manner to fall within the perimeter of the essentially circular opening 106. In order to permit the glow plug to extend down one side of the swirl chamber (in the manner shown in broken line) the open topped dome member 104 is formed with a semi-circular recess 114 which opens into the circular recess 106 in a manner as shown in FIG. 3.

With this arrangement, the section of the swirl chamber which extends between the fuel injector and the glow plug receiving bores 110 and 112, is defined by the same metal (viz., aluminum alloy) as that which defines the main body of the cylinder head 100. Accordingly, this section of the swirl chamber exhibits relatively high thermal conductivity as compared with the ceramic members 102, 104 and accordingly obviates the formation of a large stress inducing temperature diffential.

It will be noted that, as compared with the prior art, the increase in surface area which is exposed to the high temperature combustion gases and which can conduct heat away from the swirl chamber is relatively small, the fuel injector and the glow plug consuming a relatively large portion of the same. Accordingly, when compared with the prior art arrangements the actual loss of thermal insulation is small and the thermal efficiency of the engine is not affected to any noticeable degree.

Figure 4:
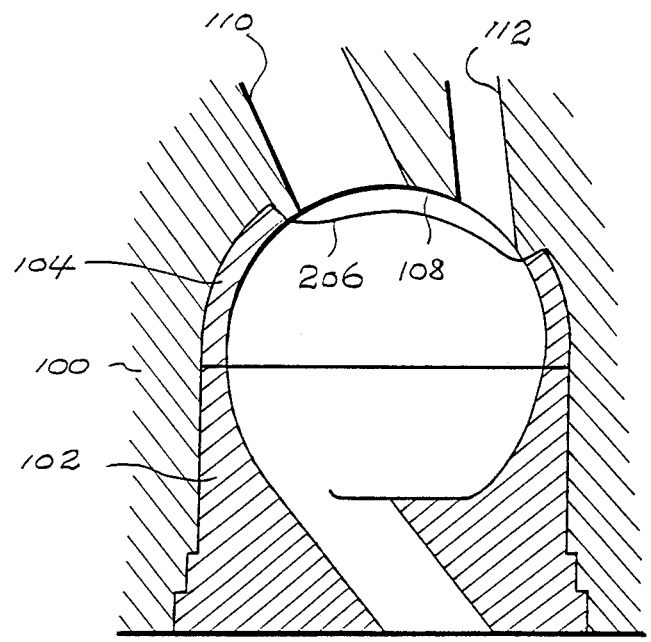
FIGS. 4 and 5 are respectively sectional elevation and plan views which show a second embodiment of the present invention.
Figure 5:
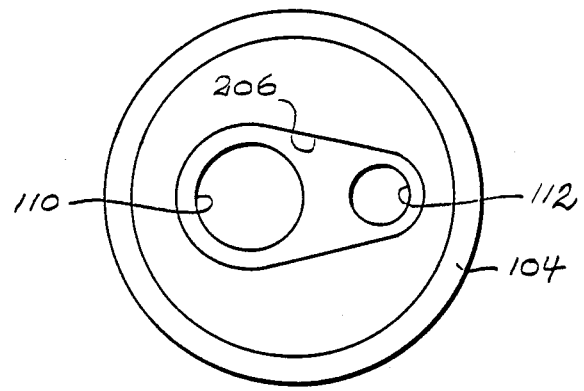

FIGS. 4 and 5 show a second embodiment of the present invention. In this arrangement the aperture formed in the top of the dome member is shaped in a manner to reduce the area of thermally conductive metallic alloy material which is exposed to the high temperature combustion gases.

Figure 6:
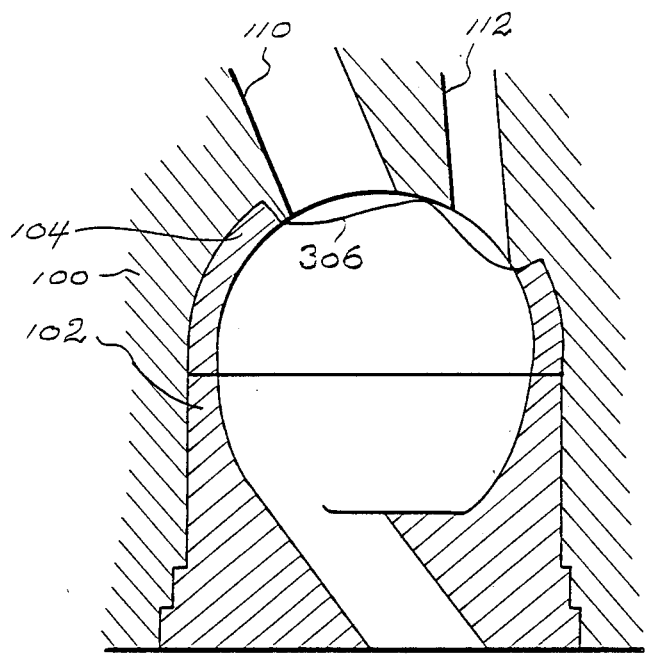
FIGS. 6 and 7 are respectively sectional elevation and plan views showing a third embodiment of the instant invention.
Figure 7:
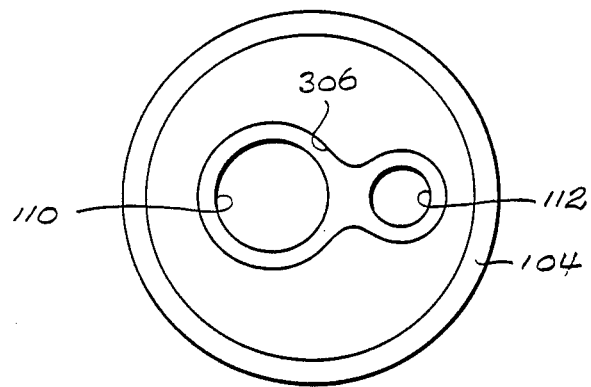

FIGS. 6 and 7 show a third embodiment of the present invention. This embodiment is similar to the second one and features a shaped aperture 306 which further minimizes the amount of metal alloy surface area which is exposed to combustion gases while removing the section of ceramic material which tends to develop cracks due to the concentration of thermally induced stress.

The application and use of the second and third embodiments is essentially identical to the first one. As the dome members of these embodiments are formed of a ceramic material, the shaped openings which characterize the same are readily formed by casting and in a manner which obviates the need for cost increasing machining and the like.

It will be of course noted that the present invention is not limited to the illustrated apertures and various modifications can be made without departing from the spirit of the invention.

What is claimed is:

1. In a swirl chamber type internal combustion engine
   a thermally insulating member disposed in a recess formed in a metallic cylinder head, said insulating member including a cavity which defines a portion of said swirl chamber;
   means defining an aperture in said insulating member; and
   means defining a metallic projection which fits into said aperture, said projection including first and second bores, said first and second bores being arranged to receive first and second devices.

2. An engine as claimed in claim 1 wherein said first and second devices comprise a fuel injector and a glow plug.

3. An engine as claimed in claim 1 furher comprising a second thermally insulating member disposed in said recess, said second insulating member having a cavity which cooperates with the cavity formed in the first said insulating member to define said swirl chamber.

4. An engine as claimed in claim 1 wherein said insulating member has an essentially dome shape and wherein said aperture is formed proximate the the crown portion of the dome shape.

5. An engine as claimed in claim 1 wherein said aperture is essentially circular.

6. An engine as claimed in claim 1 wherein said aperture has a shape which tends to minimize the area thereof.

7. An engine as claimed in claim 3 wherein the first said insulating member is disposed in a blind end of said recess and said second insulating member is disposed in an opening end of said recess in a manner which retains the first said insulating member snugly in position.

8. In an engine;
   a cylinder defined in a cylinder block;
   a piston reciprocatively disposed in said cylinder
   a cylinder head secured to said cylinder block in a manner to close the cylinder and to define a main variable volume combustion chamber, said cylinder head being formed of a metal and including a recess;
   a thermally insulating member disposed in said recess, said insulating member forming a portion of a swirl chamber which is fluidly communicated with said main variable volume combustion chamber; and
   means defining a single opening in said insulating member through which a fuel injector and a glow plug extend operatively into said swirl chamber.

* * * * *